March 24, 1970 E. C. LETTER 3,502,386
INFRARED TRANSMITTING ELEMENT
Original Filed June 17, 1959 3 Sheets-Sheet 1

INVENTOR.
EUGENE C. LETTER
BY Frank C. Parker
David F. Dougherty
ATTORNEYS

INVENTOR.
EUGENE C. LETTER
ATTORNEYS

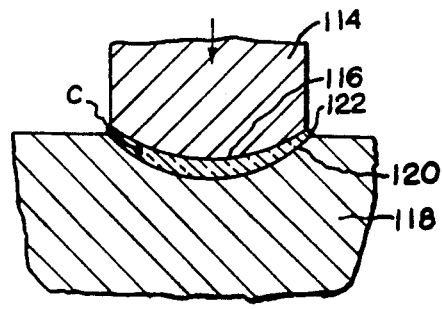
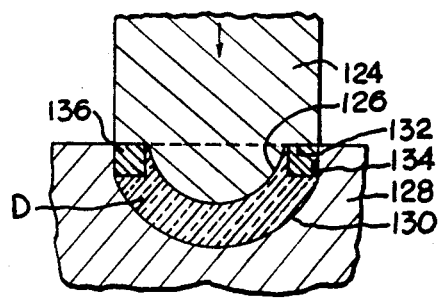
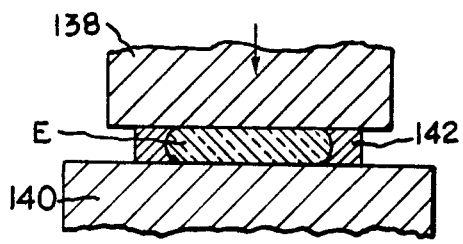
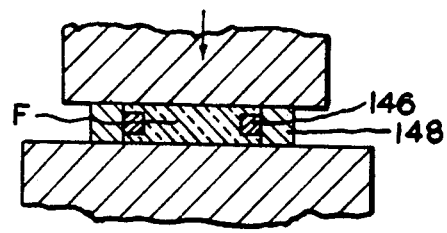
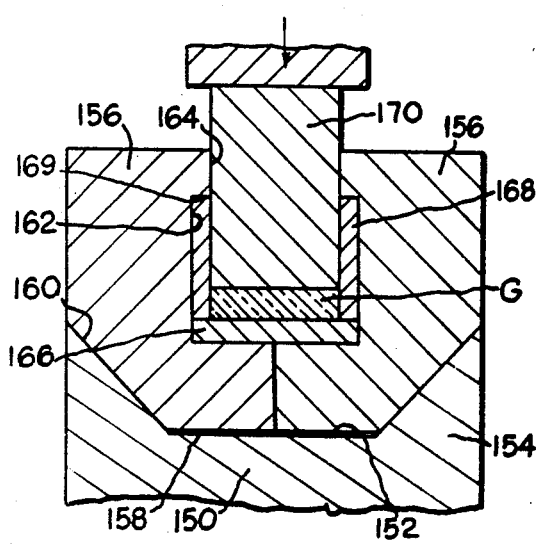
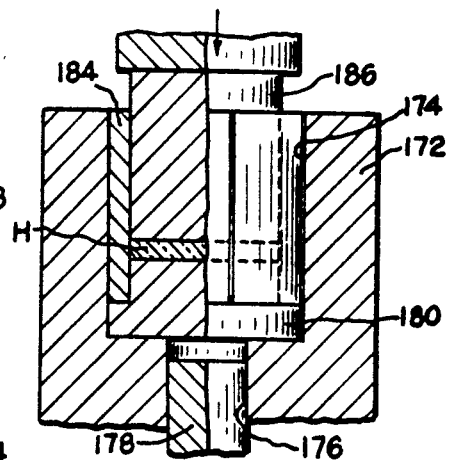

United States Patent Office 3,502,386
Patented Mar. 24, 1970

3,502,386
INFRARED TRANSMITTING ELEMENT
Eugene C. Letter, Penfield, N.Y., assignor to Bausch & Lomb Incorporated, Rochester, N.Y., a corporation of New York
Original application June 17, 1959, Ser. No. 821,040, now Patent No. 3,431,326, dated Mar. 4, 1969. Divided and this application July 31, 1964, Ser. No. 386,583
Int. Cl. G02b 1/00
U.S. Cl. 350—1                                                        7 Claims

ABSTRACT OF THE DISCLOSURE

Disclosed is an infrared transmitting element consisting of a shaped body of an isotropic crystalline alkaline earth fluoride. The articles are characterized in that at 2 mm. thickness at least 50% of the radiation of a wavelength between 1 and 12 microns is transmitted.

---

This invention relates to optical elements which are transparent to infrared radiation and to a certain extent to visible radiation.

The present application is a division of my copending application entitled Infrared Transmitting Element and Method of Making Same, Ser. No. 821,040, which was filed on June 17, 1959, now U.S. Patent No. 3,431,326.

The principal object of the invention is to produce an optical element having high transmission characteristics over a wide latitude of the infrared spectrum.

Another object of the invention is to provide an infrared transmitting element which having the chemical and physical properties permits the element to be readily handled and reformed for practical uses of the element.

The present invention involves a hot pressing technique applied to polycrystalline material with the underlying basic principle being in the elimination of light scattering sites, such as voids in the material. The radiation transmitted both in the visible and infrared portions of the spectrum, by a pure polycrystalline material, is determined by its inherent absorption and by the amount of radiation scattered by the voids.

In order to minimize the number and size of voids or to eliminate them altogether, the present invention contemplates the utilization of concurrent applications of heat and pressure to a confined material which intrinsically is infrared transmitting. Such concurrent application of heat and pressure upon the material produces a compact which will transmit in the infrared and, if desired, in the visible region of the spectrum. This compact has the appearance of glass and may be ground and polished if necessary in order to improve transmission.

The materials utilized for the present invention were selected from the alkaline earth fluorides, that is, the fluorides of the elements of Group II of the Periodic Table, and include $MgF_2$, $CaF_2$, $SrF_2$ and $BaF_2$. The selected materials can be in granular or powdered form, and are confined in a die during concurrent application of heat and high pressure. In producing the optical elements in the form of compacts, the pressure and temperature are applied in the ranges of 2,000–60,000 p.s.i. and 500°–1,300° C., respectively. During concurrent application of heat and pressure, the particles are compacted, that is, joined together into an integrated crystalline mass which will assume the shape of the die. The resulting mass is crystalline as distinguished from glass but does exhibit some properties of glass such as transparency in the visible portion of the spectrum. The die material has sufficient strength at the temperature utilized to contain the material under the applied pressure and is sufficiently inert as to not react with the contained material.

Other objects and advantages will become apparent to those skilled in the art from the following specification taken in conjunction with the accompanying drawings wherein:

FIGS. 6–11 are cross-sections of various dies which may be utilized with the machine of FIG. 1.

Figure 1:
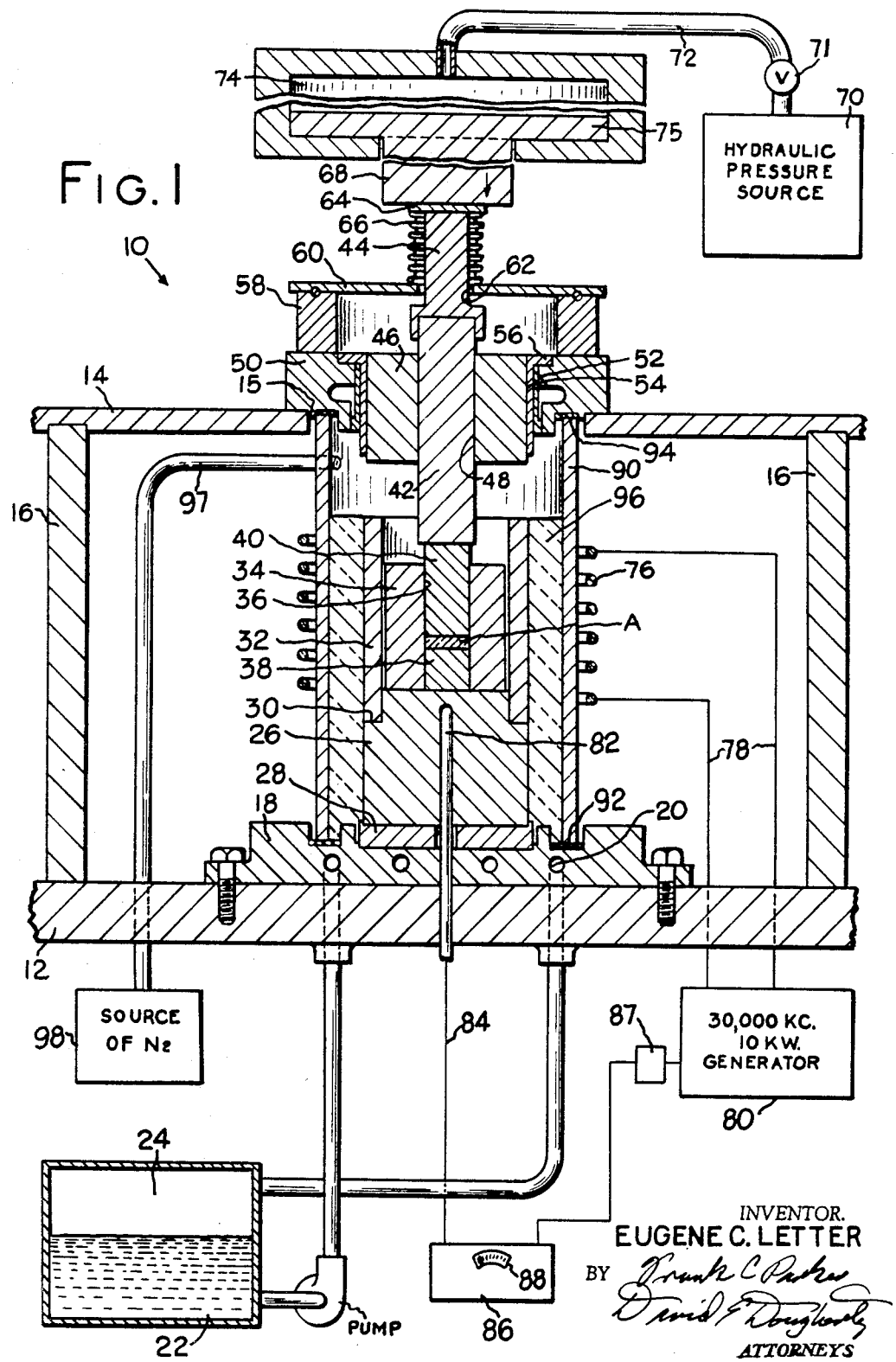
FIG. 1 is a cross-section of a heat-pressure generating machine for producing the compacts of the present invention.

Referring now to FIG. 1, a heat-pressure generating machine is shown in the form of an induction hot press generally indicated by the reference numeral 10. The hot press comprises a press block 12 which serves as the base for the press, a top plate 14 having a circular opening 15 formed centrally thereof, and support rods 16 which support the top plate parallel to and spaced from the base block 12. The thicknesses of the block 12 and the plate 14 and the diameters of the rods 16 are relatively great in order to form a unitary structure which is adapted to support the elements of the hot press equipment that experience pressures up to 60,000 p.s.i.

Situated between the base block 12 and the plate 14 and bolted centrally of the block 12 is a base block 18 through which is formed a passageway 20 which may weave through the block 18 in serpentine fashion. The passageway may be connected at one end to a source of water 22 and at the other end to a reservoir 24 in order to circulate water continuously through the block 18 for cooling the same.

Resting centrally of the support block 18 is a cylindrical die support block 26 detachably retained within a disk 28 which in turn is detachably retained on the base block 18. An annular shoulder 30 formed on the upper end of the die support block 26 serves to support a cylindrical receptor 32 which may be in the form of two symmetrical half elements each being semi-circular in cross-section. Concentric with the receptor 32 and resting therein upon the die support block is a cylindrical die holder 34 which is formed with a cylindrical chamber 36. The axes of the chamber 36, the die holder 34, and the receptor 32 are in alignment with the axes of the die support block 26.

The die comprises a cylindrical anvil 38 which is retained within the chamber 36 and rests upon the top surface of the support block 26, and a plunger 40 slidably received within the chamber 36. The plunger 40 is movable vertically along the axis of the chamber and is supported by a push rod 42 which in turn is supported by an elongated cylindrical clamp 44. Vertical movement of the plunger 40, the push rod 42 and the clamp 44 along a line coincident with the axis of the chamber 36 is assured by the provision of a guide block 46 which is formed with a cylindrical passage 48 through which the push rod 42 is slidably guided. The guide block 46 is supported centrally upon the plate 14 by means of a mounting ring 50 which is secured to the circular edge of the central opening 15 formed in the top plate 14. Within the ring 50 and secured to the inner surface thereof is an outer bearing sleeve 52. Concentric with this sleeve and adapted to slide therein is an inner bearing sleeve 54 which is secured to the outer cylindrical surface of the guide block 46. The upper end of the inner sleeve 54 is provided with an annular flange 56 which overlaps the adjacent end of the inner sleeve 52 and interfits with an annular shoulder formed in the top end surface of the mounting ring 50. With this structure, the sleeve 56 is held against downward movement and is adapted for limited upward movement relative to the stationary outer sleeve 52. In effect then, as the push rod is moved upwardly or downwardly, the block 46 will guide this movement along a straight and fixed line. In so guiding, any tendency of the guide block to move laterally will be prevented by means of the inner and outer bearing sleeves and any vertical movement of the guide block will be felt in a bearing action between these sleeves.

Mounted above the ring 50 and suitably secured to the top surface thereof is a smaller ring 58. Above this ring and secured thereto is a circular plate 60 which is centrally formed with an opening 62 through which the clamp 44 projects. The clamp 44 has secured thereto at its extreme upper end, a disk 64 which has a diameter slightly larger than the diameter of the shank of the clamp. A relatively heavy bellows 66 is held in compression between the edge of the disk 64 and the edge of the plate adjacent the opening 62. In order to render the system airtight, the bellows is preferably brazed to the plate 60 and the disk 64. The bellows 66 serves to normally bias the plunger 40, the push rod 42 and the clamp 44 upwardly after these elements have been externally forced downwardly and this force released. As shown in FIG. 1, these elements are in their lowermost position with a compact A of crystal polycrystalline material having been compressed.

In order to apply downward pressure to the die plunger 40, a vertically movable press ram 68 is provided and is engageable with the disk 64 on the clamp 44. A suitable hydraulic pressure source 70 under the control of a valve 71 and connected by a pipe line 72 to a cylinder chamber 74 for a piston head 75 secured to the upper end of the press ram 68 serves to pressurize the chamber 74. With pressure being built up in the chamber 74 above the head 75, a corresponding force will be exerted upon the plunger 40 and consequently the compact A. For purposes of this invention, it is intended that the source 70 is capable of delivering a force to the compact A having a range of 2,000 p.s.i. to 60,000 p.s.i.

The die and the compact A are heated by induction and to this end there is provided an induction coil 76 which encircles the die elements 38 and 40. The coil 76 is connected by conductors 78 to a high frequency generator 80 which will induce oscillating current in the coil 76 at a valve sufficient to heat the compact A at a temperature range of 500° C. to 1300° C. The generator utilized for the compact described hereinafter had an output of 10 kilowatts operating at a frequency of about 30,000 kc. Means are also provided for controlling the current in the coil 76 in order to vary the temperature of the compact A and to this end, a thermocouple sensing element 82 is positioned within the die support block 26 for sensing the temperature surrounding the compact. A lead 84 connects the thermocouple to an electronic controller 86 which may be any one of a number of commercially available types. The controller is connected through a reactor 87 to the high frequency generator 80 for controlling the current generated thereby. A suitable temperature indicator 88 may be utilized to visually indicate temperature of the compact.

To complete the structure of induction hot press 10, the receptor 34 and the die support block 26 are surrounded by a quartz tubular element 90 which is coaxial with the element and spaced therefrom. The tubular element 90 is held in the position shown between the upper surface of the base 18 and the under surface of the mounting ring 50. Rubber gaskets 92, 94 on the coacting surfaces of the base 18 and ring 50, respectively, serve to maintain the chamber within the tubular element 90 airtight. Suitable insulation 96 is utilized between the inner surface of the element 90 and the outer surfaces of the block 26 and the receptor 34 to thereby minimize heat transfer from the die elements.

The die block 26, the die elements 38, 40 and the receptor 34 may be made from high temperature metallic alloys or graphite. If the lower temperatures of the range 500° C.–1300° C. and the higher pressures of the range 2000–60,000 p.s.i. are utilized, then the alloys are preferable. In the use of alloys, at elevated temperatures in atmospheres containing oxygen, oxides of the metals may form and cause adherence between these structural elements of the die. In order to eliminate this adherence, separating agents are applied to the coacting surfaces of the structural elements in order to permit removal of these elements after a hot press operation. If it is desired to use the high end of the above temperature range and the low end of the pressure range, the structural elements 26, 38, 40 and 34 are made of graphite and this use does not involve adherence between these elements. The support block 26, the push rod 42 and the guide block 46 are also made of graphite. In order to prevent the graphite structure from becoming damaged due to the combined effect of the heat and temperatures, the air in the chamber of the tubular element 90 is exhausted and $N_2$ pumped therein. As shown in FIG. 1, a nozzle 97 connected to a source 98 of $N_2$ is in communication with the chamber in order to surround the graphite elements with the inert gas $N_2$.

The hot press 10 is capable of compressing powdered polycrystalline material into a compact which is a solid integrated mass and glass-like in appearance. A small quantity of the powdered material is laid and leveled upon the anvil 38 and the plunger 40 is lowered until the lower surface of the plunger is in contact with the material. Concurrent application of heat in the range of 500° C. to 1300° C. and pressure in the range of 2,000 p.s.i. to 60,000 p.s.i. is then applied to the material. This concurrent application of heat and pressure serves to eliminate or reduce scattering sites, such as voids, in the material. As is known, the radiation transmitted in the visible and infrared portions of the spectrum by a pure polycrystalline material is determined by its inherent absorption and by the amount of radiation scattered by voids. The transmission in a pure isotropic material may be approximately expressed as follows:

$$I = I_0 \cdot e^{-kt} \cdot e^{-ct_v d_v [(n_a - n_v)/\lambda]^2}$$

where $I$ = intensity of the transmitted radiation
$I_0$ = intensity of the incident radiation
$k$ = absorption coefficient of the isotropic material, (cm.$^{-1}$)
$t$ = thickness of the compact in cm.
$d_v$ = geometric mean volume diameter of voids in microns
$t_v$ = the effective thickness of voids in microns = to the thickness of voids if packed together in a single section of the highest packing distribution
$n_a$ = refractive index of compact material
$n_v$ = refractive index of voids (approximately equal to 1.00)
$\lambda$ = wavelength in microns
$c$ = a constant taken to be 7

The polycrystalline material may be any of these alkaline earth fluorides, $MgF_2$, $CaF_2$, $SrF_2$ and $BaF_2$. Upon compacting, the powdered material is accreted, resulting in a hard glass-like element which may be ground, polished and machined for use. Structurally, the resultant compact is non-vitreous, having been formed solely by compaction. Samples have been made which are transparent in the visible and infrared portions of the spectrum. The transmission curves, illustrated in FIGS. 2–5, are indicative of four examples of compacts made in accordance with the present invention.

Figure 2:
FIGS. 2–5 illustrate typical spectral transmission curves of examples of the compacts made according to the present invention.

The curve in FIG. 2 illustrates the measured transmission characteristic of a compact of $MgF_2$ made in accordance with the principles of the present invention. The resultant compact was 2 mm. in thickness and experienced the application of heat at 675° C. and pressure at 35,000 p.s.i. It will be noted that there is over 40% transmission in the visible portion of the spectrum and over 80% transmission in the infrared up to seven microns wavelength.

Figure 3:

The curve in FIG. 3 illustrates the measured transmission characteristics of a compact of $SrF_2$ having a thickness of 2.9 mm. and which was hot pressed at 650° C. and at a pressure of 37,000 p.s.i. Again, there is over 40% transmission in the visible portion of the spectrum and tapering of transmission as the wavelength increases. At 13 microns of wavelength, transmission is approximately 20%.

Figure 4:
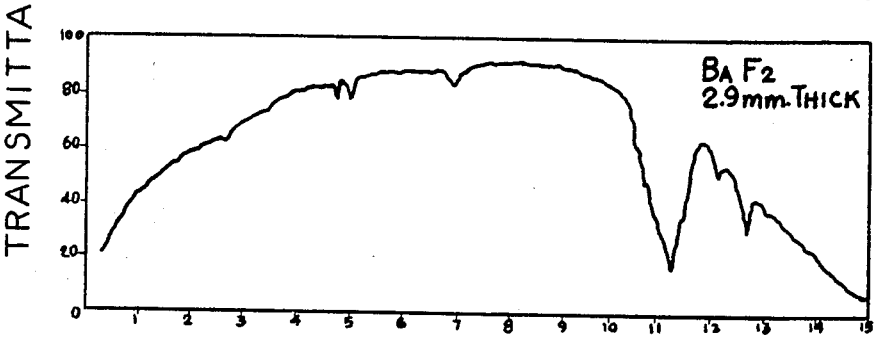
Figure 5:
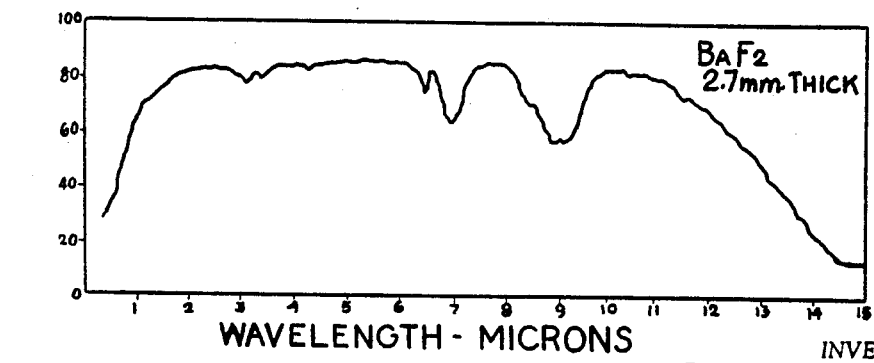

In FIG. 4, the curve represents transmission characteristics of a compact of $BaF_2$, at a thickness of 2.9 mm. and which was hot pressed at 1225° C. at a pressure of 6,000 p.s.i. Transmission in the visible portion of the spectrum is over 20% and in the infrared over 80% for a wavelength range of between 4–10 microns. Except for a sharp cut-off at 11 microns, the transmission of the compact in the infrared portion extends out to 15 microns where transmission is approximately 10%. In FIG. 5, another curve for a compact of $BaF_2$ is illustrated and this compact has a thickness of 2.7 mm. and was hot pressed at 600° C. at a pressure of 34,000 p.s.i. Transmission in the visible portion of the spectrum is over 20% and again the transmission in the infrared extends out to 15 microns wavelength.

As shown in FIG. 1, the opposing faces of the die anvil 38 and the die plunger 40 are flat and thus, upon hot press application, the compact A will have flat surfaces. In FIGS. 6–11 the die elements are illustrated as having other shapes and structures for producing compacts having corresponding shapes. In FIG. 6, the die plunger 114 is shown as having a convex curved surface 116 and the die anvil 118 having a concave curved surface 120 for compacting an arcuate compact C. The radius of curvature of the curved surface 120 is larger than that for the surface 116 and is struck from a point spaced from the center of curvature of the surface 116 resulting in a compact having a thicker central portion and tapering slightly toward the circular edge of the compact. It will be noted that the circular edges of the curved surfaces 116 and 120 are spaced from one another to define a clearance 122 around and between the die surfaces. During compaction, a small portion of the material in the die is extruded through this clearance and the amount so extruded is predetermined in accordance with the amount of clearance and the flow viscosity of the material utilized. When the force produced on the material adjacent the clearance due to the pressure exerted by the die plunger 114 is balanced by the flow restriction characteristics of the material through the clearance, extruding of the material will cease and the extruded material will serve as a seal for the die.

In FIG. 7, the die plunger 124 is illustrated as having a die surface 126 of hemispherical shape and the anvil 128 is illustrated as also being formed with a die surface 130 generally hemispherical in shape and having a radius of curvature different than the radius of curvature of the surface 126 but with its center of curvature being struck from the same point. The compact D produced in this die will be dome-shaped and will have generally equal thicknesses throughout. The die plunger 124 is also formed with a circular horizontal shoulder 132 around the curved surface portion 126 while the anvil 128 is formed with a right cylindrical surface 134 contiguous to the edge of the curved surface 130 and extending vertically to the top end of the anvil. As illustrated, the shoulder and the cylindrical surface 134 are normal to one another and the outer edge of the shoulder has a radius equal to the radius of the surface 134. A stainless steel mounting ring 136 having an axial thickness equal to the length of the cylindrical surface 134 and an outer diameter equal to the diameter of the surface 134 is retained therein. Upon compaction, the shoulder 132 on the die plunger engages the adjacent end of the ring 136 and is compressed along with the material of the compact D. The resultant compact is a composite article of polycrystalline material chemically bonded to the metallic ring. Such chemical bond results from the reaction between the fluorides and the ring components at elevated temperature and pressure. The center portion is a transmitting material which has good strength, chemical stability and is permanently encircled by the ring 136 which can be machined, drilled and threaded for mounting purposes.

In FIG. 8, there is shown a die similar to that shown in FIG. 1, which die comprises a die plunger 138 and an anvil 140 having a diameter larger than that of the plunger 138. In this die, a metallic ring 142 is positioned between the opposing die surfaces of the plunger and anvil and has a concave inner edge in order to cooperate with the coacting convex edge of the compact material. To insure the chemical bond between the coacting edges of the ring and the material, the ring 142 of FIG. 8 is made of a relatively soft material such as steel so that it is deformable under the conditions of temperature and pressure used. The material of the ring 142 is also selected to have a slightly higher coefficient of expansion than the center transmitting material so that upon cooling to room temperature from the elevated pressing temperature the center polycrystalline area will be held on compression by the ring. In the die of FIG. 7, the ring 136 has a coefficient of expansion matched with that of the material compacted in order to minimize the effect of tension placed upon the dome-shaped compact D.

The die of FIG. 9 is similar to that of FIG. 8 except that two rings are utilized during hot pressing. In this die, a small non-deformable ring 146 is fitted concentrically within a large deformable ring 148 and is of lesser axial thickness than the larger ring. The material of the compact F is placed within, above and below the smaller ring and during compaction, the material will be chemically bonded on three sides of the smaller ring. After the removal of the compact, the outer ring 148 may be removed and the compact ground and polished to a high degree of precision without affecting the strength of the bonding effect of the material upon the inner ring. The advantage in this type of die is that since the inner ring need not be deformable, a greater number of materials is available for a mounting ring in the event a particular metal is required for this purpose.

In FIG. 10, a cylindrical die support block 150 is provided and is formed with a horizontal flat top surface 152 terminating in angled surface portions 154 which extend upwardly approximately at angles of 50° to the side of the support block. Resting upon this support block is a die holder comprising two identical elements 156 which are symmetrically arranged on either side of the longitudinal axis of the support block 150. Each of the elements 156 is formed with a flat horizontal bottom surface 158 and an angled surface 160 which conform to a half of the surface 152 and the angled surface on one of the portions 154, respectively. When assembled upon the support block 150, the elements 156 are retained against outward displacement by the angled portions 154 and the abutting inner surfaces of the elements are in coincidence with the longitudinal axis of the support block 150.

Each of the elements 156 is formed with a generally central recess 162 which is semi-circular in cross-section when viewed from the top or in a plane normal to the plane of the drawing. When the elements 156 are assembled, the recesses 162 combine to form a cylindrically shaped chamber which extends upwardly to a circular opening 164 for the chamber. This opening has its center of curvature on the same line as the center of curvature for the chamber and has a diameter slightly smaller than the latter. Within the chamber and having a diameter approximately equal thereto is a disk-shaped plate 166 which is positioned across the lower end of the chamber. A cylindrical liner 168 having an outer diameter equal to that of the plate 166 rests on one end of the plate and extends upwardly to terminate at an annular shoulder 169 separating the cylindrical wall of the chamber and the opening 164. As was the case with the die holder 34 in the die of FIG. 1, the liner 168 is split into two identical half cylinders having semi-circular cross-section. The plate 166 and the liner 168 serve to confine the material of the compact G. The inner diameter of the liner is equal to the diameter of the opening 164 in order to slidably accommodate a die plunger 170. The advantage in the use of the die illustrated in FIG. 10 is that the die may be disassembled and the compact removed while the die apparatus is still at elevated temperature. In the dies of FIGS. 6, 7, 8, 9 and 10, the die apparatus generally will require cooling before handling the die parts. In FIG. 10, the elements 156 may be easily broken open leaving the split liner 168 free to be pulled apart to expose the compact G.

Another die apparatus which will permit easy removal of the compact while the apparatus is at elevated temperatures is shown in FIG. 11. The die apparatus includes a cylindrical die support block 172 formed with a centrally disposed cylindrical recess 174 in the top thereof. A cylindrical channel 176 communicates with the recess 174 at the lower end thereof and slidably accommodates a vertically movable plunger 178. The longitudinal axis of the channel 176 and the recess 174 are in alignment with the longitudinal axis of the support block 172. At the bottom of the recess 174 and in the path of the plunger 178 is a circular die anvil 180 having an annular shoulder 182 for supporting a die liner 184. The liner is similar to the liner 168 of FIG. 10, that is, it is of the split half cylinder type and lines the cylindrical wall of the recess 174. The anvil 180 extends upwardly into the liner 184 and cooperates with a die plunger 186 slidably received within the liner 184. When the compact H has been hot pressed and the die plunger 186 has been raised out of the liner, the plunger 178 is moved upwardly, by any suitable means, in order to extricate the liner, anvil and compact from the die support block 172. The liner section may then be split apart to expose the compact for removal from the die apparatus.

From the foregoing description, it will be appreciated that the present invention involves a novel infrared transmitting optical element having transmitting characteristics in the visible portion of the spectrum. It will also be appreciated that the optical element has transmission characteristics over a wide latitude of the infrared spectrum. There is also disclosed a novel method for producing these optical elements wherein a minimum number of parts and steps for material handling is required. While there is in this application specifically described one form and method for making the same which the invention may assume in practice, it will be understood that this form and method are shown and described for purposes of illustration only, and that the same may be modified and embodied in various other forms or employed in other uses without departing from the spirit or the scope of the appended claims.

I claim:

1. A cohesive shaped body consisting essentially of an isotropic crystalline alkaline earth fluoride, said body being relatively transparent to infrared radiation and having a transmission characteristic at 2 mm. thickness of at least about 50% for radiation of 1–12 microns wavelength.

2. A cohesive shaped body consisting essentially of a material selected from the group consisting of barium fluoride, calcium fluoride, and strontium fluoride, said material being in polycrystalline form, and said body being relatively transparent to infrared radiation and having a transmission characteristic at 2 mm. thickness of at least about 50% for radiation of 1–12 microns wavelength.

3. A cohesive shaped body consisting essentially of polycrystalline barium fluoride, said body being relatively transparent to infrared radiation and having a transmission characteristic at 2 mm. thickness of at least about 50% for radiation of 1–12 microns wavelength.

4. A cohesive shaped body consisting essentially of polycrystalline strontium fluoride, said body being relatively transparent to infrared radiation and having a transmission characteristic at 2 mm. thickness of at least about 50% radiation of 1–12 microns wavelength.

5. A cohesive shaped body consisting essentially of polycrystalline calcium fluoride, said body being relatively transparent to infrared radiation and having a transmission characteristic at 2 mm. thickness of at least about 50% for radiation of 1–12 microns wavelength.

6. An infrared transmitting optical element comprising a cohesive body consisting essentially of an isotropic crystalline alkaline earth fluoride, said body having a transmission characteristic at 2 mm. thickness of at least 50% for radiation of 1–12 microns wavelength, and a metal annulus surrounding said body and integrally bonded thereto, said annulus having a thermal expansion coefficient approximately equal to the coefficient of said body, the stress between said annulus and said body being of relatively small value.

7. An infrared transmitting optical element comprising a cohesive body consisting essentially of an isotropic crystalline alkaline earth fluoride, said body having a transmission characteristic at two millimeters thickness of at least 50% for radiation of 1–12 microns wavelength, and a metal annulus surrounding said body and integrally bonded thereto, said annulus having a thermal coefficient of expansion greater than the coefficient of said body and holding said body in compression.

References Cited

UNITED STATES PATENTS

| | | | |
|---|---|---|---|
| 2,219,574 | 10/1940 | Fraenckel | 65—49 X |
| 2,362,430 | 11/1944 | Buerger | 264—66 X |
| 2,460,334 | 2/1949 | Buerger et al. | 264—66 X |
| 3,359,066 | 12/1967 | Hatch et al. | 350—1 X |
| 3,365,271 | 1/1968 | Cornell et al. | |

DAVID SCHONBERG, Primary Examiner

T. H. KUSMER, Assistant Examiner

U.S. Cl. X.R.

23—88; 106—47; 264—66; 350—320